United States Patent
Phan et al.

(10) Patent No.: US 7,573,519 B2
(45) Date of Patent: Aug. 11, 2009

(54) METHOD FOR CORRECTING ECLIPSE OR DARKLE

(75) Inventors: Christina Phan, San Jose, CA (US); Marco Cazzaniga, Palo Alto, CA (US)

(73) Assignee: Eastman Kodak Company, Rochester, NY (US)

( * ) Notice: Subject to any disclaimer, the term of this patent is extended or adjusted under 35 U.S.C. 154(b) by 499 days.

(21) Appl. No.: 11/258,812

(22) Filed: Oct. 26, 2005

(65) Prior Publication Data

US 2007/0091193 A1    Apr. 26, 2007

(51) Int. Cl.
- H04N 5/335 (2006.01)
- H04N 9/64 (2006.01)
- H04N 5/217 (2006.01)
- H01L 27/00 (2006.01)

(52) U.S. Cl. .................... 348/311; 348/243; 348/241; 250/208.1

(58) Field of Classification Search ............. 348/241, 348/294, 296–297, 308, 311, 243, 223.1; 250/208.1
See application file for complete search history.

(56) References Cited

U.S. PATENT DOCUMENTS

| | | | |
|---|---|---|---|
| 4,792,859 A * | 12/1988 | Wicker et al. ............... | 358/473 |
| 6,469,740 B1 * | 10/2002 | Kuroda et al. ............... | 348/308 |
| 6,803,958 B1 | 10/2004 | Wang | |
| 6,822,679 B1 * | 11/2004 | Kulhalli et al. ............... | 348/246 |
| 6,844,896 B2 * | 1/2005 | Henderson et al. .......... | 348/241 |
| 6,873,363 B1 | 3/2005 | Barna et al. | |
| 6,888,572 B1 * | 5/2005 | Kozlowski ................... | 348/308 |
| 7,477,298 B2 * | 1/2009 | Lee et al. ..................... | 348/241 |
| 2004/0012696 A1 * | 1/2004 | Teratani et al. .............. | 348/246 |
| 2004/0075759 A1 * | 4/2004 | Sato et al. ................... | 348/246 |
| 2006/0044414 A1 | 3/2006 | Lee et al. | |
| 2006/0238634 A1 * | 10/2006 | Yan .............................. | 348/308 |

* cited by examiner

*Primary Examiner*—Nhan T Tran
*Assistant Examiner*—Trung Diep
(74) *Attorney, Agent, or Firm*—Peyton Watkins

(57) ABSTRACT

A CMOS image sensor includes a plurality of pixels arranged column and rows in an array; a column circuit for storing reset values and a value after integration; a correlated double sampler which derives an image signal from the reset and the value after integration; and an anti-eclipse circuit physically separately from the column circuit and electrically connected to one or shared between multiple columns of pixels for restoring corrupted column voltage on a column of pixels.

8 Claims, 4 Drawing Sheets

METHOD FOR CORRECTING ECLIPSE OR DARKLE

FIELD OF THE INVENTION

The present invention relates generally to the field of CMOS image sensors, and more particularly, to such image sensors having an anti-eclipse circuit for addressing reset problems. The anti-eclipse circuit is physically separated from a column circuit for preventing undesirable noise in captured images.

BACKGROUND OF THE INVENTION

A disadvantage of CMOS image sensors is its sensitivity to strong light when it shines onto the pixel array. A typical example of this problem is when the camera is pointed directly to the sun; the sensor will output a "black" sun instead of a bright one in the image. This phenomenon is referred to as eclipse or darkle. U.S. Ser. No. 10/607,943, filed Jun. 27, 2003, entitled "CMOS Image Sensor Oversaturation Protection Circuit," by Christina Phan et al., addresses this problem. Referring to FIG. 1, there is shown a pixel array 10, column and eclipse circuit 20, and a correlated double sampler circuit 30. This prior art technique requires the correction to be implemented in the column and eclipse circuit 20. As the pixel pitch gets smaller, it may not be feasible to fit a single column circuit in the width of a single pixel. Therefore, it is common to put multiple columns together as a unit cell. The entire column-circuit array is then generated by replicating this unit cell. In this case, including the correction feature will make the layout of the column circuit extremely challenging. The imbalance created by including this feature will worsen the mismatch between the columns. And as a result of this, a pattern of structured noise, measured as Fixed Pattern Noise (FPN), an important optical specification in image sensors, will be present in the image.

Consequently, a need exists for overcoming this shortcoming. The present invention addresses this shortcoming by permitting the correction to be done as a stand-alone circuit. This preserves the balance of the layout of the column circuit while providing a solution to the eclipse or darkle problem.

SUMMARY OF THE INVENTION

The present invention is directed to overcoming one or more of the problems set forth above. Briefly summarized, according to one aspect of the present invention, the invention resides in a CMOS image sensor comprising a plurality of pixels arranged in columns and rows in an array; a column circuit for storing reset values and a value after integration; a correlated double sampler which derives an image signal from the reset and the value after integration; an anti-eclipse circuit physically separated from the column circuit and electrically connected to one or shared between multiple columns of pixels for restoring corrupted column voltage on a column of pixels.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

An advantage of this invention is the preservation of the simplicity and the balance of the layout of the column circuit. This will prevent structure noise from occurring in the image while successfully addressing the eclipse or darkle issue.

BRIEF DESCRIPTION OF THE DRAWINGS

FIG. 2b is an alternative embodiment of FIG. 2a.

DETAILED DESCRIPTION OF THE INVENTION

Figure 1:
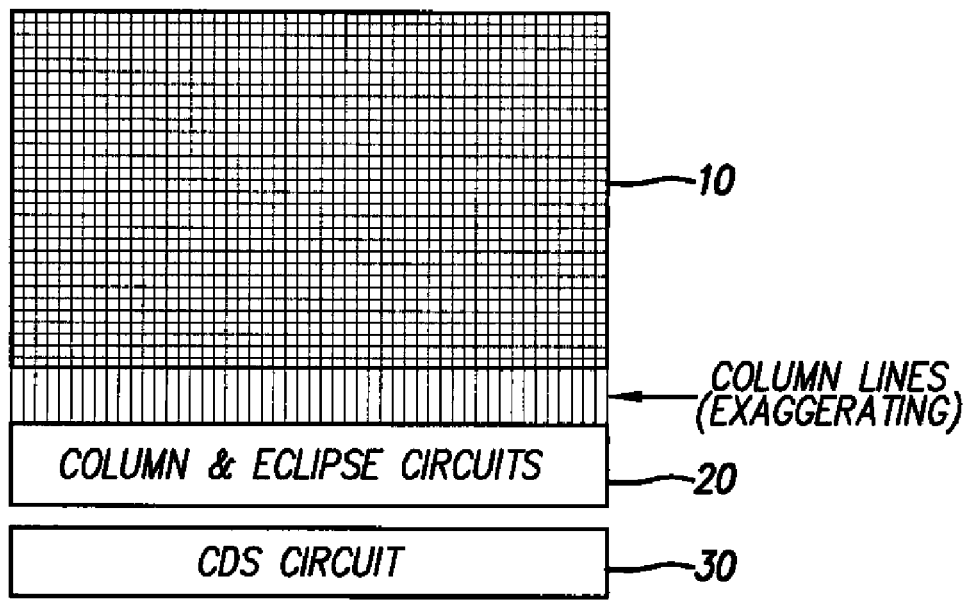
FIG. 1 is a top view of a prior art image sensor.
Figure 2A:
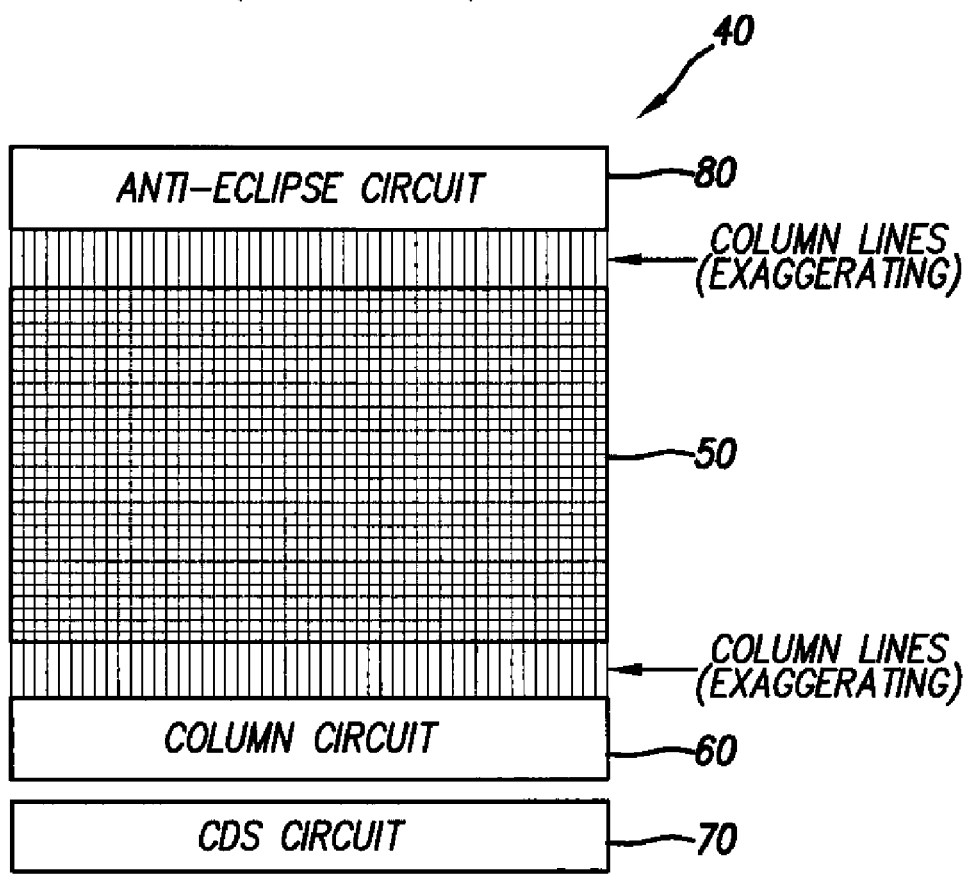
FIG. 2a is a top view of the image sensor of the present invention.
Figure 3:
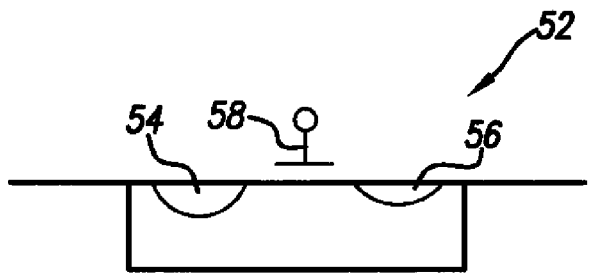
FIG. 3 is a side view of a typical pixel of FIGS. 2a and 2b.

Referring to FIG. 2a, there is shown the image sensor 40 of the present invention that includes a plurality of pixels arranged in a two-dimensional array 50. Referring briefly to FIG. 3, each pixel 52 includes preferably either a pinned photodiode or a photodiode (sensing region 54) that is exposed to incident light for a desired period of time, referred to as integration, which causes charge to be collected within the sensing region 54. The pixel 52 also includes charge-to-voltage conversion circuitry 56 that receives the charge from the sensing region through a transfer gate 58 and converts the charge to a voltage, which will be referenced herein as the sample image signal.

Referring back to FIG. 2a, the operation of the image sensor includes two basic operations, reset and the above-mentioned integration. During the reset phase, the photodiode is set to a known reference voltage, often referred to as a reset level. Depending on the light intensity, this reset level is discharged to ground in the integration phase. The reset level and the final level after the integration phase, sample image signals, are stored in the column circuit 60. These voltages are then subtracted in the correlated double sampler 70.

During reset, an anti-eclipse circuit 80 senses the above-described reset level on the column line and compares it to a preset threshold. If this reset level drops below this threshold, the anti-eclipse circuit 80 will detect and rectify the reset signal level on the column line, as will be described in detail hereinbelow.

Figure 4A:
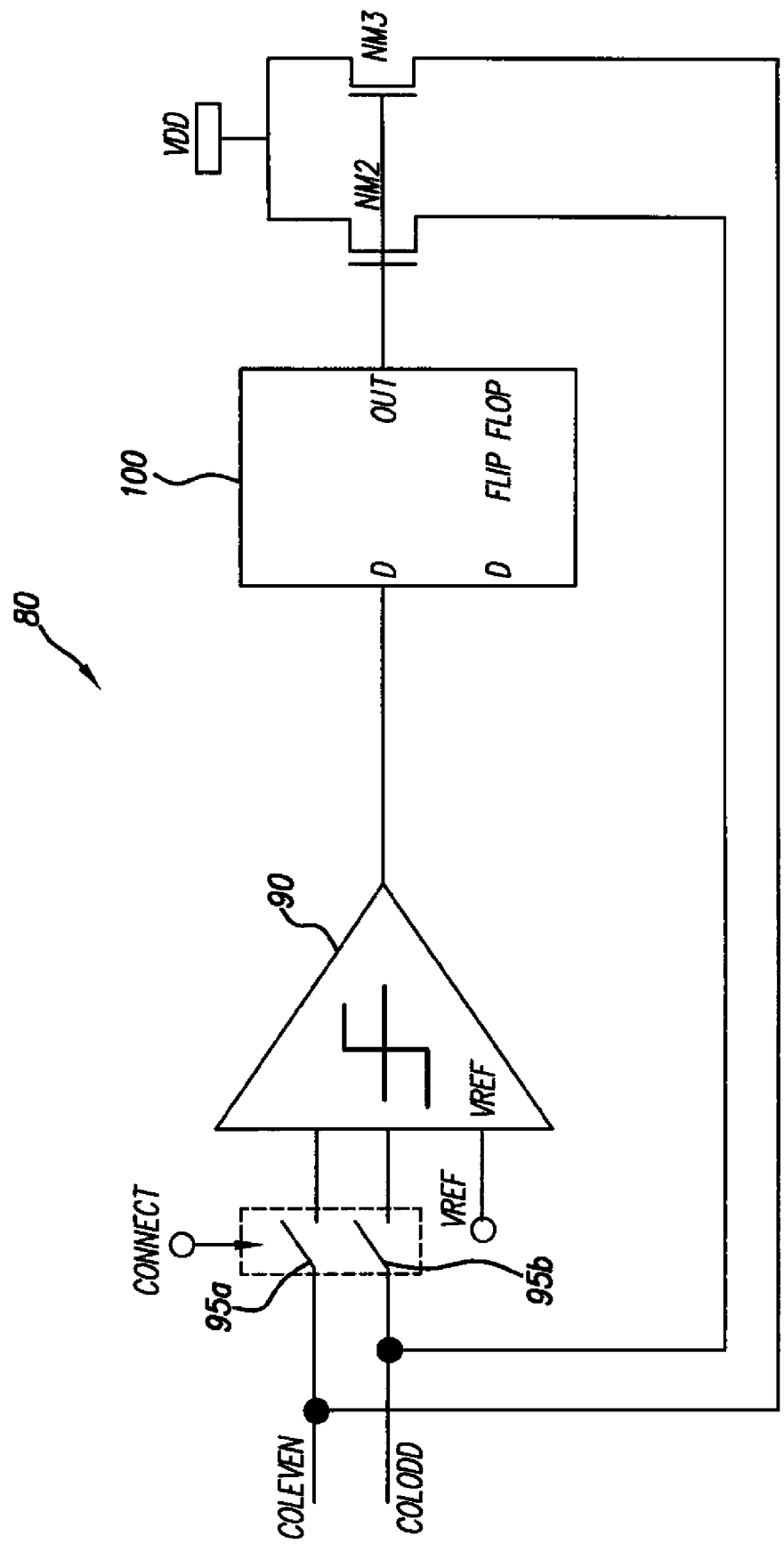
FIGS. 4a and 4b are schematic diagrams of the of eclipse circuit of the present invention.
Figure 4B:
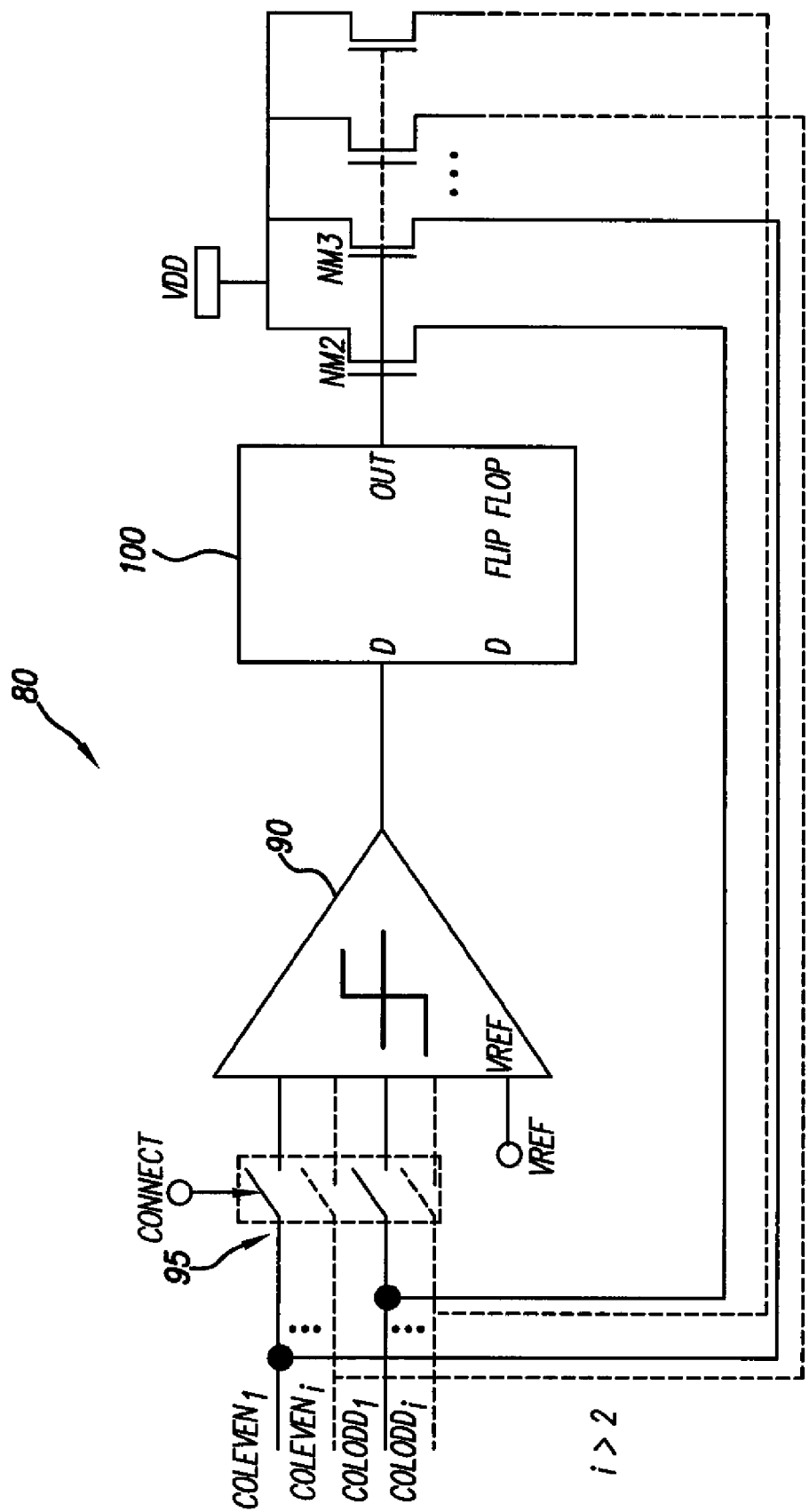

The anti-eclipse circuit 80 in this description is illustrated as a circuit that provides correction for only 2 columns (coleven, colodd) as shown in FIG. 4a. For example, coleven is connected to one column and colodd is connected to another column of the pixel array. FIG. 4b shows that this anti-eclipse circuit can be easily expanded to provide correction for more columns. For example, coleveni represents the even columns in the pixel array, and coloddi represents the odd columns, (where i is 1, 2, 3 and the like up to the maximum columns in the pixel array).

Figure 2B:
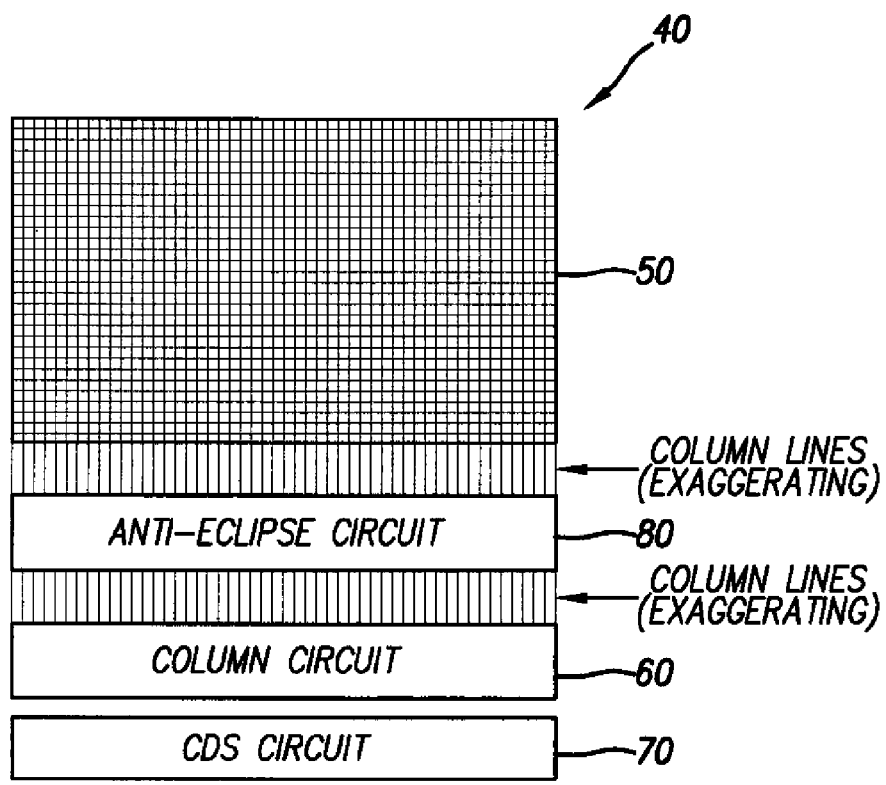

The anti-eclipse circuit 80 is physically separately from the column circuit 60 and electrically connected to one or shared between multiple columns of pixels for restoring corrupted column voltage on a column of pixels. In other words, the anti-eclipse circuit 80 is a stand-alone circuit and may be on any side of the pixel array 50. For example, FIG. 2b, illustrates the anti-eclipse circuit 80 on the same side as the column circuit 60, but is it is still isolated or a stand-alone circuit as noted hereinabove.

Referring to FIG. 4a, the anti-eclipse or correction circuit 80 includes a comparator 90 that senses the reset signal level on one column line (can be either colodd or coleven) via two electrical connections each in series with a switch 95a and 95b. Each switch 95a and 95b is put into a position that permits a connection between the comparator input 90 and column line for permitting the comparator 90 to sense the reset level on the column line only during reset.

The comparator 90 compares the sensed voltage to a preset threshold. If the voltage on the column line falls below the preset threshold, an eclipse or darkle event is then detected. When this happens, the comparator 90 sends out a trigger signal. The trigger signal is then latched into a digital flip-flop 100 on the rising edge of a signal that also controls reset level sampling on the column circuit 60. The flip-flop 100 will then generate a signal to pull the column line voltage to the level equivalent to the normal (non-eclipse) reset level.

After sending the correction signal, switches 95a and 95b are put into a position that disconnects the comparator's input from the column line and connects it to ground to deactivate the sensing. The column line voltage remains at the corrected level until the clear signal is received by the flip-flop. This "clear" signal is designed to occur after the completion of the sample reset phase of the column circuit 60.

Those skilled in the art will recognize that the signal that enables the flip-flop to latch has to align well with the detection pulse coming from the comparator. Any misalignment will cause the flip-flop to miss or misinterpret the detection.

Figure 5:
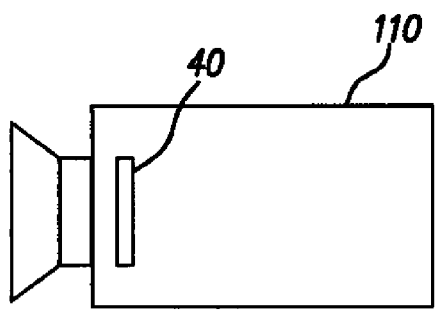
FIG. 5 is a side view of a digital camera containing the image sensor of the present invention.

Referring to FIG. 5, there is shown a digital camera or imaging device 110 containing the image sensor 40 of the present invention for illustrating a typical commercial embodiment to which the ordinary consumer is accustomed.

The invention has been described with reference to a preferred embodiment. However, it will be appreciated that variations and modifications can be effected by a person of ordinary skill in the art without departing from the scope of the invention.

PARTS LIST 10 prior art pixel array image sensor
20 prior art column and eclipse circuit
30 correlated double sample circuit
40 image sensor
50 two-dimensional pixel array
52 pixel
54 pinned photodiode or a photodiode (sensing region)
56 charge-to-voltage conversion circuitry
58 transfer gate
60 column circuit
70 correlated double sample circuit
80 anti-eclipse circuit
90 comparator
95 switches
95a switch
95b switch
100 digital flip-flop
110 digital camera or imaging device

The invention claimed is:

1. A CMOS image sensor comprising:
(a) a plurality of pixels arranged in columns and rows in an array;
(b) a column circuit for storing reset signal levels and sample image signals after integration;
(c) a correlated double sampler which derives an image signal from the reset signal levels and the sample image signals after integration;
(d) an anti-eclipse circuit physically separated from the column circuit and electrically connected to one or shared between multiple columns of pixels for detecting when a reset signal level on a column of pixels falls below a preset threshold during a reset operation and for restoring the reset signal level on the respective one or multiple columns of pixels, wherein the anti-eclipse circuit comprises
 a comparator connected to one or more column of pixels via switches for comparing a predetermined voltage to a reset signal level from one of the column of pixels;
 a flip-flop connected to an output of the comparator and one or more switches connected between an output of the flip flop and the respective one or multiple columns of pixels.

2. The CMOS image sensor as in claim 1 further comprising a pinned photodiode or a photodiode as the sensing region for the pixel.

3. The CMOS image sensor as in claim 1, wherein the anti-eclipse circuit is positioned on any side of the image sensor.

4. An imaging device comprising:
a CMOS image sensor comprising:
(a) a plurality of pixels arranged column and rows in an array;
(b) a column circuit for storing reset signal levels and sample image signals after integration;
(c) a correlated double sampler which derives an image signal from the reset signal levels and the sample image signals after integration;
(d) an anti-eclipse circuit electrically and physically separately from the column circuit and electrically connected to one or shared between multiple columns of pixels for detecting when a reset signal level on a column of pixels falls below a preset threshold during a reset operation and for restoring the reset signal level on the respective one or multiple columns of pixels, wherein the anti-eclipse circuit comprises
 a comparator connected to the respective one or multiple columns of pixels via switches for comparing a predetermined voltage to a reset signal level from one of the column of pixels; and
 a flip-flop connected to an output of the comparator and one or more switches connected between an output of the flip flop and the respective one or multiple columns of pixels.

5. The imaging device as in claim 4 further comprising a pinned photodiode or a photodiode as the sensing region for the pixel.

6. The imaging device as in claim 4, wherein the anti-eclipse circuit is positioned on a side of the image sensor opposite the column circuit.

7. A CMOS image sensor comprising:
(a) a plurality of pixels arranged in columns and rows in an array;
(b) a column circuit for storing reset signal levels and sample image signals after integration;
(c) a correlated double sampler which derives an image signal from the reset signal levels and the sample image signals after integration; and
(d) an anti-eclipse circuit physically separated from the column circuit and electrically connected to one or shared between multiple columns of pixels for detecting when a reset signal level on a column of pixels falls below a preset threshold during a reset operation and for restoring the reset signal level on the respective one or multiple columns of pixels, wherein the anti-eclipse circuit comprises
 a switch connected to each column line;

a comparator having two or more input lines, wherein one input line is connected to a reference voltage and at least one other input line is connected to a column of pixels when a respective switch is placed in a first position;

a flip-flop connected to an output of the comparator; and at least one transistor having a gate connected to an output of the flip-flop.

8. The CMOS image sensor as in claim 7, wherein the anti-eclipse circuit is positioned on any side of the image sensor.

* * * * *